US 7,862,670 B2

(12) United States Patent
Hansson et al.

(10) Patent No.: US 7,862,670 B2
(45) Date of Patent: Jan. 4, 2011

(54) PROCESS FOR THE MANUFACTURING OF A DECORATIVE LAMINATE PROVIDED WITH AN ALIGNED SURFACE

(75) Inventors: Krister Hansson, Vellinge (SE); Ake Sjoberg, Lund (SE)

(73) Assignee: Pergo AG, Baar (CH)

( * ) Notice: Subject to any disclaimer, the term of this patent is extended or adjusted under 35 U.S.C. 154(b) by 650 days.

(21) Appl. No.: 10/578,484

(22) PCT Filed: Oct. 26, 2004

(86) PCT No.: PCT/SE2004/001547

§ 371 (c)(1),
(2), (4) Date: Aug. 14, 2006

(87) PCT Pub. No.: WO2005/046987

PCT Pub. Date: May 26, 2005

(65) Prior Publication Data

US 2007/0079925 A1  Apr. 12, 2007

(30) Foreign Application Priority Data

Nov. 13, 2003  (SE) .................................... 0303018

(51) Int. Cl.
 *B29C 65/00* (2006.01)
 *B29C 65/02* (2006.01)
 *B32B 37/00* (2006.01)
 *B32B 38/00* (2006.01)
(52) U.S. Cl. ....................................................... 156/64
(58) Field of Classification Search .................... 156/64
 See application file for complete search history.

(56) References Cited

U.S. PATENT DOCUMENTS

| 4,557,778 | A | 12/1985 | Held | |
|---|---|---|---|---|
| 2001/0047702 | A1* | 12/2001 | Tychsen | ........................ 83/13 |
| 2003/0159385 | A1 | 8/2003 | Thiers | |
| 2003/0183334 | A1* | 10/2003 | Sjoberg et al. | ........... 156/307.3 |
| 2003/0205012 | A1 | 11/2003 | Garcia | |

FOREIGN PATENT DOCUMENTS

| DE | 10146304 | 4/2003 |
|---|---|---|
| EP | 1153736 | 11/2001 |

\* cited by examiner

*Primary Examiner*—Philip C Tucker
*Assistant Examiner*—Michael N Orlando
(74) *Attorney, Agent, or Firm*—Novak Druce & Quigg LLP

(57) ABSTRACT

A process for the manufacture of a decorative board, which board includes at least one thermosetting resin impregnated paper layer. A decor paper in the form of a web or a sheet, provided with a plurality of decor sections, each decor section being intended to constitute a decor of a decorative panels, is placed as a surface layer on a base layer and bonded thereto by pressing under elevated pressure. A plurality of press plates or press foils, each press plate or press foil being provided with a surface structure intended to match at least one decor section of the decor paper, are accurately positioned on top of the thermosetting impregnated paper layer before the pressing and is after the pressing separated from the laminate achieved. The laminate will hereby be provided with a decor surface with a matching surface structure which is in register with the decor of the decor paper.

21 Claims, No Drawings

PROCESS FOR THE MANUFACTURING OF A DECORATIVE LAMINATE PROVIDED WITH AN ALIGNED SURFACE

This application is a 35 USC §371 U.S. National Stage Application of International Application No. PCT/SE2004/001547, filed on Oct. 26, 2004, claiming the priority of Swedish Patent Application No. 0303018-6, filed Nov. 13, 2003, the entire disclosures of which are incorporated herein by reference in their entireties.

The present invention relates to a process for the manufacture of a decorative thermosetting laminate with a surface structure that realistically matches the decor of the upper surface.

Products coated with thermosetting laminates are frequent today. They are foremost used where the demand for abrasion resistance is high, but also where resistance towards different chemicals and moisture is required. As an example of such products floors, floor beadings, table tops, work tops and wall panels can be mentioned.

The thermosetting laminate mostly consists of a number of base sheets with a decor sheet placed closest to the surface. The decor sheet can be provided with a desired decor or pattern. The most frequent patterns usually represent the image of different kinds of wood, or minerals such as marble or granite. The surface of the laminate can be provided with a structure during the laminating procedure which will make the decor more realistic. Press plates with structure or structure foils are frequently used when manufacturing such a laminate. A negative reproduction of the structure in the press plate or the press foil will be imprinted into the laminate during the laminating procedure.

The structure suitably represents features characteristic for the pattern the decor represents in the laminate. The structure can be made coarse to simulate for example roughly planed stone, or smooth with randomly placed pits and micro cracks to simulate polished marble. A wood surface is simulated by providing the surface with randomly placed thin oblong indentations which imitate pores. There are however some difficulties to achieve a match between the decor and the structure. This is mainly due to the fact the substrate holding the decor is subject to a number of treatments which will inevitably change its format. The substrate carrying the surface structure will not be subject to the same format change as the decor substrate. It will hereby be virtually impossible to achieve a desired alignment between printed decor and surface structure over the whole surface of the board produced.

It has for a long time been a great need to be able to manufacture a decorative thermosetting laminate with a decor pattern for example with decor sections directed in different directions and with a matching surface structure.

According to the present invention the above mentioned needs have been met and a thermosetting laminate with a decorative surface with a matching surface structure has been achieved. The invention relates a process for the manufacture of a decorative board, which board includes at least one thermosetting resin impregnated paper layer. The invention is characterised in that a decor paper in the form of a sheet, provided with a plurality of decor sections, each decor section being intended to constitute a decor of a decorative panel, is placed as a surface layer on a base layer and bonded thereto by pressing under elevated pressure. A plurality of press plates or press foils, each press plate or press foil being provided with a surface structure intended to match at least one decor section of the decor paper, are accurately positioned on top of the thermosetting impregnated paper layer before the pressing and is after the pressing separated from the laminate achieved. The laminate will hereby be provided with a decor surface with a matching surface structure which is in register with the decor of the decor paper.

The positions of the decor sections of the decor paper is suitably detected by means of a camera array sending data input to a computer. The data input from the camera array is then used for accurately guiding the positioning of the press plates or press foils on top of the paper layer.

The decor paper has a longitudinal and a latitudinal direction, and that the decor paper contains longitudinal rows of longitudinally or latitudinally arranged panels. According to one embodiment of the invention the panels have a rectangular shape. According to another embodiment of the invention the panels have a square shape.

According to one embodiment of the invention the decor paper is provided with means for positioning selected from the group consisting of colour dots, colour lines, grid patterns holes, code lines, indentations and combinations thereof. Said positioning means are arranged in a predetermined relation to the decor sections. The positioning means are preferably detected by the camera array for positioning of the press plates or press foils. The positioning means are further used for guiding the cutting of the decorative board into panels. The panels are preferably also provided with joining means at the edges. The positioning means are suitably also here used for accurately guide the position of the edges, and thereby also the joining means, in relation to the decor. It is to be understood in the present invention that the printed decor it self may advantageously be used as a positioning means.

According to one embodiment of the invention the positions of the decor sections of the decor paper is detected by means of a second camera array sending data input to a computer. The data input from the second camera array is used after the pressing for accurately guiding the positioning of tools selected from the group consisting of; cutting and milling tools used for cutting the decorative board into panels and providing said panels with means for joining. The second camera array is advantageously further used for controlling the quality achieved. The camera array then suitably comprises at least one matrix colour camera for detecting colour of the decor paper and at least one reflection camera for detecting the surface structure. The data input from the two camera types are then compared in a control computer for evaluation of alignment between decor and surface structure. The alignment evaluation data of the control computer is then used by the computer for calculating statistical process guiding of the positioning of the press plates or press foils during the lamination procedure.

At least one wear layer is preferably arranged on top of the decor paper in order to increase the wear resistance. The wear layer may be constituted by one or more so called overlay papers impregnated with a thermosetting amino resin or one or more layers of thermosetting amino resin compound with gelling agent or filler. The layers suitably also comprise hard particles. The, at least one, wear layer is then arranged between the decor paper and the press plate or press foil during the lamination procedure. The, at least one, overlay paper is preferably impregnated with melamine-formaldehyde resin before the lamination procedure. The, at least one, overlay paper preferably further comprises hard particles with an average particle size in the range 50 nm-150 μm. It is also advantageous to provide the uppermost surface of the overlay paper facing the press plate or press foil provided with hard particles with an average particle size in the range 50 nm-30 μm in order to increase the scratch resistance. The hard particles are suitably constituted of aluminum oxide, silicon oxide or silicon carbide and are suitably applied to an amount of 1-50 g/m³. The overlay paper may be replaced by a layer of thermosetting resin, for example melamine-formaldehyde, which contains a gelling agent or a filler, as for example cellulose arranged on top of the decor. This layer also contains hard particles in, and/or on top of, the layer as described above. The process and other parameters are as described above.

The base layer suitably consists of a particle board, oriented strand board or a fibre board. A fibre board is also known as MDF (medium density fibre board) and HDF (high density fibre board) which both are suitable to be used as base layer in the present invention. According to one embodiment of the invention the base layer consist of a particle board, oriented strand board or fibre board with at least one base paper layer of for example Kraft-paper arranged thereon. The base paper layer is then impregnated with a thermosetting resin selected from the group consisting of melamine-formaldehyde, phenol-formaldehyde, urea-formaldehyde and combinations thereof.

It will according to the present application be possible to achieve a perfect match of desired aspects of the surface structure. Accordingly the surface structure may be described as incorporating deeper structure and more shallow structure. A deeper structure may be used for simulating for example pores and cracks in wood. They may also be used for simulating the effects of worn wood where the softer portions of the wood is worn away creating depressions. This effect can also be found in wood where moisture levels have been very high on occasion. The deeper structures may also be used to simulate fissures in minerals like stone, marble, granite and sandstone but also in ceramic materials. These deeper structures may simulate the surface of roughly planned stone, chisel marks in minerals or wood etc. The common theme for these, deeper structures, are that they have a difference in level which between highest and lowest point which is above 0.05 mm. These structures are advantageously achieved during the lamination procedure.

It has so far been rather difficult to match these surface structures on a large board format so that when a number of tiles or panels are cut from this board, the surface structure will match over the edges, once the panels or tiles are joined together. The surface may also incorporate different gloss grades in order provide the impression of polished to buffed surfaces.

A typical example of a simulation of a real product may be described in the following way in order to facilitate the understanding. A decor paper with a decor depicting weathered birch is impregnated with melamine formaldehyde resin which then is dried to a so-called B-stage. The decor paper is then arranged as on top of a base layer of HDF board. On top of this decor paper is arranged two layers of so-called overlay paper impregnated with melamine formaldehyde resin and sprinkled with aluminum oxide particles before drying the papers to a so called B-stage. The uppermost surface of the uppermost overlay has particles with an average particle size below 30 μm, while subjacent surfaces of the overlay papers incorporate larger particles, preferably in the range 50 μm to 150 μm. The described stack of one base layer, one decor layer and two overlay layers are then laminated together in a laminate press after having arranged a press plate or press foil on top of the overlay. Each press foil or press plate is then provided with portions of flat, low gloss surfaces, portions of semi-gloss surfaces together with narrow oblong protrusions, all designed and matched to fit the actual decor section of the decor paper. The protrusions of the press plate or press foil will in the finished laminate create narrow indentations simulating pores in wood. Predetermined portions of the surface, for example portions corresponding to the darker portions of the birch decor is provided with the higher gloss rate. This will create a very lifelike impression of oil-treated birch. Real wood treated with oil will naturally have a higher gloss rate in resin rich portions of the wood as these portions does not absorb the oil to the same extent as the rest of the wood does.

After having laminated the different layers together under increased temperature and pressure the laminate press is opened and the press plate or press foil is separated from the laminate achieved. This laminate board is then cut into panels and provided with means for joining along the edges. Also the cutting and milling process is suitably guided by means of the printed decor or, for example, guiding lines printed together with the decor.

Accordingly it will be possible to achieve life like simulation of surfaces when simulating different kinds of wood as for example oak, birch, beech, ash, cherry, maple, walnut, pine, rosewood, teak, mahogany and ebony as well as minerals like marble, granite, sandstone, soapstone and ceramic materials which also are popular reproductions. The surface structures use for simulating surfaces to mach the above materials may comprise narrow oblong indentations in the surface of 0.1-2 mm width and 0.02-1 mm depth which may simulates pores, and cracks of wood. Wood grain may be simulated by sweeping patterns of indentations of 1-25 mm width and 0.1-2 mm depth. It is also possible to provide the surface with combinations of gloss and flat surfaces in sections which additionally may be raised or recessed. It is of course also possible to create completely fantasy based patterns of surface structures.

In order to simplify the process and reduce the number of press plates or press foils needed it is possible to use press plates or press foils which carries the surface structure of two or more adjacent decor sections. The positioning of these press plates or press foils are then guided by means of virtual centre points and virtual centre lines which can be obtained by means of the camera array together with the computer.

According to an alternative embodiment of the present invention the above mentioned needs have been met and a thermosetting laminate with a decorative surface with a matching surface structure has been achieved through means of a continuous process. Accordingly, the alternative embodiment invention relates a continuous process for the manufacture of a decorative board, which board includes at least one thermosetting resin impregnated paper layer. The invention is characterised in that a decor paper in the form of a web or a sheet, provided with a plurality of decor sections, each decor section being intended to constitute a decor of a decorative panel, is placed as a surface layer on a base layer and bonded thereto by pressing under elevated pressure. A plurality of press foil webs, each press foil web being provided with a surface structure intended to match at least one decor section of the decor paper, are accurately positioned on top of the thermosetting impregnated paper layer before the pressing and is after the pressing separated from the laminate achieved. The laminate will hereby be provided with a decor surface with a matching surface structure which is in register with the decor of the decor paper.

The positions of the decor sections of the decor paper is suitably detected by means of a camera array sending data input to a computer. The data input from the camera array is then used for accurately guiding the positioning of the press foil webs on top of the paper layer.

The press foil webs are suitably guided in a longitudinal direction by means of tension control of the press foil web and the latitudinal direction by adjusting the latitudinal position of the press foil web.

The decor paper has a longitudinal and a latitudinal direction, and the decor paper contains longitudinal rows of longitudinally arranged panels. According to one embodiment of the invention the panels have a rectangular shape. According to another embodiment of the invention the panels have a square shape.

According to one embodiment of the alternative embodiment invention the decor paper is provided with means for positioning selected from the group consisting of colour dots, colour lines, grid patterns holes, code lines, indentations and combinations thereof. Said positioning means are arranged in a predetermined relation to the decor sections. The positioning means are preferably detected by the camera array for positioning of the press foil webs. The positioning means are further used for guiding the cutting of the decorative board into panels. The panels are preferably also provided with joining means at the edges. The positioning means are suitably also here used for accurately guide the position of the edges, and thereby also the joining means, in relation to the decor. It is to be understood in the present invention that the printed decor it self may advantageously be used as a positioning means.

According to one embodiment of the alternative embodiment invention the positions of the decor sections of the decor paper is detected by means of a second camera array sending data input to a computer. The data input from the second camera array is used after the pressing for accurately guiding the positioning of tools selected from the group consisting of; cutting and milling tools used for cutting the decorative board into panels and providing said panels with means for joining. The second camera array is advantageously further used for controlling the quality achieved. The camera array then suitably comprises at least one matrix colour camera for detecting colour of the decor paper and at least one reflection camera for detecting the surface structure. The data input from the two camera types are then compared in a control computer for evaluation of alignment between decor and surface structure. The alignment evaluation data of the control computer is then used by the computer for calculating statistical process guiding of the positioning of the press foil webs during the lamination procedure.

At least one wear layer is preferably arranged on top of the decor paper in order to increase the wear resistance. The wear layer may be constituted by one or more so called overlay papers impregnated with a thermosetting amino resin or one or more layers of thermosetting amino resin compound with gelling agent or filler. The layers suitably also comprise hard particles. The, at least one, wear layer is then arranged between the decor paper and the press plate or press foil during the lamination procedure. The, at least one, overlay paper is preferably impregnated with melamine-formaldehyde resin before the lamination procedure. The, at least one, overlay paper preferably further comprises hard particles with an average particle size in the range 50 nm-150 µm. It is also advantageous to provide the uppermost surface of the overlay paper facing the press plate or press foil provided with hard particles with an average particle size in the range 50 nm-30 µm in order to increase the scratch resistance. The hard particles are suitably constituted of aluminum oxide, silicon oxide or silicon carbide and are suitably applied to an amount of 1-50 g/m$^3$. The overlay paper may be replaced by a layer of thermosetting resin, for example melamine-formaldehyde, which contains a gelling agent or a filler, as for example cellulose arranged on top of the decor. This layer also contains hard particles in, and/or on top of, the layer as described above. The process and other parameters are as described above.

The base layer may also in the alternative embodiment suitably consist of a particle board, oriented strand board or a fibre board. A fibre board is also known as MDF (medium density fibre board) and HDF (high density fibre board) which both are suitable to be used as base layer in the present invention. According to one embodiment of the invention the base layer consist of a particle board, oriented strand board or fibre board with at least one base paper layer of Kraft-paper arranged thereon. The base paper layer is then impregnated with a thermosetting resin selected from the group consisting of melamine-formaldehyde, phenol-formaldehyde, urea-formaldehyde and combinations thereof.

Since the repetition length of the characteristic structure patterns of the press foil webs in fact is the determining factor it becomes necessary to use a matching zone on this web or to have the length of the decor sheets slightly shorter than this repetition length. In the case where a continuous base paper web is used as a base for the decor this will cause no problem. However, when panels are used as a base or included in the base, some adjustments to the process is desirable. It is highly advantageous to have such panels arranged edge to edge, closely together during the press cycle. This will of course lead to a matching problem as the repetition length of the press foil webs and the repetition length of the panels need to match over time. This is suitably achieved by using two or more sets of panels with different repetition length. A first set of panels is then slightly longer than the repetition length of the press foil webs while a second set is slightly shorter than the repetition length of the press foil webs. The first or second type of panels are then selected through means of the process parameters and edge identification means to achieve a desired match between panel edge and press foil webs. It is also possible to use further sizes of panels where one size would be a nominal length which would be seen as an attempt at matching the repetition length of the press foil webs. Shorter and longer panels will then be used occasionally to adjust any drift in matching between edge and structure. It alternatively possible to add a milling operation which, guided by the process parameters adjusts the length of the panels.

It will according to the present application be possible to achieve a perfect match of desired aspects of the surface structure. Accordingly the surface structure may be described as incorporating deeper structure and more shallow structure. A deeper structure may be used for simulating for example pores and cracks in wood. They may also be used for simulating the effects of worn wood where the softer portions of the wood is worn away creating depressions. This effect can also be found in wood where moisture levels have been very high on occasion. The deeper structures may also be used to simulate fissures in minerals like stone, marble, granite and sandstone but also in ceramic materials. These deeper structures may simulate the surface of roughly planned stone, chisel marks in minerals or wood etc. The common theme for these, deeper structures, are that they have a difference in level which between highest and lowest point which is above 0.05 mm. These structures are advantageously achieved during the lamination procedure.

It has so far been rather difficult to match these surface structures on a large board format so that when a number of tiles or panels are cut from this board, the surface structure will match over the edges, once the panels or tiles are joined together. The surface may also incorporate different gloss grades in order provide the impression of polished to buffed surfaces.

A typical example of a simulation of a real product may be described in the following way in order to facilitate the understanding. A decor paper with a decor depicting weathered birch is impregnated with melamine formaldehyde resin which then is dried to a so-called B-stage. The decor paper is then arranged as on top of a base layer of HDF board. On top of this decor paper is arranged two layers of so-called overlay paper impregnated with melamine formaldehyde resin and sprinkled with aluminum oxide particles before drying the papers to a so called B-stage. The uppermost surface of the uppermost overlay has particles with an average particle size below 30 μm, while subjacent surfaces of the overlay papers incorporate larger particles, preferably in the range 50 μm to 150 μm. The described stack of one base layer, one decor layer and two overlay layers are then laminated together in a continues laminate press continuously guiding press foil webs in position on top of the overlay. Each press foil web is provided with portions of flat, low gloss surfaces, portions of semi-gloss surfaces together with narrow oblong protrusions, all designed and matched to fit the actual decor section of the decor paper. The protrusions of the press foil webs will in the finished laminate create narrow indentations simulating pores in wood. Predetermined portions of the surface, for example portions corresponding to the darker portions of the birch decor is provided with the higher gloss rate. This will create a very lifelike impression of oil-treated birch. Real wood treated with oil will naturally have a higher gloss rate in resin rich portions of the wood as these portions does not absorb the oil to the same extent as the rest of the wood does.

After having laminated the different layers together under increased temperature and pressure in the end of the continuous laminate press the press foil webs are separated from the laminate achieved. This laminate board is then cut into panels and provided with means for joining along the edges. Also the cutting and milling process is suitably guided by means of the printed decor or, for example, guiding lines printed together with the decor.

Accordingly it will be possible to achieve life like simulation of surfaces when simulating different kinds of wood as for example oak, birch, beech, ash, cherry, maple, walnut, pine, rosewood, teak, mahogany and ebony as well as minerals like marble, granite, sandstone, soapstone and ceramic materials which also are popular reproductions. The surface structures use for simulating surfaces to match the above materials may comprise narrow oblong indentations in the surface of 0.1-2 mm width and 0.02-1 mm depth which may simulates pores, and cracks of wood. Wood grain may be simulated by sweeping patterns of indentations of 1-25 mm width and 0.1-2 mm depth. It is also possible to provide the surface with combinations of gloss and flat surfaces in sections which additionally may be raised or recessed. It is of course also possible to create completely fantasy based patterns of surface structures.

In order to simplify the process and reduce the number of press foil webs needed it is possible to use press foil webs which carries the surface structure of two or more parallel adjacent decor sections. The positioning of these press foil webs are then guided by means of virtual centre points and virtual centre lines which can be obtained by the camera array together with the computer.

The invention claimed is:

1. A process for the manufacture of a decorative board with joining edges; said process comprising
providing a décor layer and at least one paper layer impregnated with a thermosetting resin on a base layer;
using a first camera array to detect position of décor sections on the décor layer;
generating a first data input, using said first data input to accurately guide positioning of a press plate or press foil on top of the décor layer;
laminating the décor layer, paper layer and base onto the board layer under heat and pressure to obtain a laminated board with surface structure in register with the décor sections of the décor layer;
machining at least an edge of the board;
detecting the quality of a décor section on the décor layer of the laminated board with a second camera array by sensing a color with at least one color camera and by sensing the surface structure with at least one reflection camera and comparing the data input from the color camera and reflection camera in a control computer for evaluation of alignment between décor and surface structure;
sending data obtained from the first camera to a computer; and
utilizing the computer to guide a tool to machine an edge of the board.

2. A process according to claim 1 wherein at least one wear layer is arranged on top of the decor layer in order to increase the wear resistance, that the at least one wear layer is arranged between the decor layer and the press plate or press foil during the lamination procedure.

3. A process according to claim 2 wherein the wear layer comprises at least one overlay paper which is impregnated with melamine-formaldehyde resin before the lamination procedure.

4. A process according to claim 3 wherein the at least one overlay paper further comprises hard particles with an average particle size in the range 50 nm-150 μm.

5. A process according to claim 4 wherein the uppermost surface of the overlay paper facing the press plate or press foil is provided with hard particles with an average particle size in the range 50 nm-30 μm.

6. A process according to claim 1 wherein the base layer-comprises a particle board or a fibre board.

7. A process according to claim 1 wherein the base layer comprises a particle board or a fibre board with at least one base paper layer arranged thereon, the base paper layer being impregnated with a thermosetting resin selected from the group consisting of melamine-formaldehyde, phenol-formaldehyde, urea-formaldehyde and combinations thereof.

8. A process according to claim 1 wherein the decor layer has a longitudinal and a latitudinal direction, and that the decor layer contains longitudinal rows of longitudinally arranged panels.

9. A process according to claim 1 wherein the decor layer has a longitudinal and a latitudinal direction, and that the decor layer contains longitudinal rows of latitudinally arranged panels.

10. A process according to claim 8 wherein the panels have a rectangular shape.

11. A process according to claim 8 wherein the panels have a square shape.

12. A process according to claim 1 wherein the position indicator is selected from the group consisting of color dots, color lines, grid patterns holes, code lines, indentations, that said positioning means are arranged in a predetermined relation to the decor sections.

13. A process according to claim 8 wherein the positioning indicator is selected from the group consisting of color dots, color lines, grid patterns, holes, code lines, indentations, that said positioning means are arranged in a predetermined relation to the decor sections.

14. A process according to claim 1 wherein the camera used for positioning of the press plates or press foils, is also used for machining at least the edge of the decorative board.

15. A process according to claim 14 wherein the panels are provided with joining elements at the edges, that a positioning indicator is used to accurately guide the machining of the edges, and thereby also the position of the joining element in relation to the decor.

16. A process according to claim 1 wherein alignment evaluation data of the control computer is used by a computer for calculating statistical process guiding of the positioning of the press plates or press foils prior to the lamination step.

17. The process of claim 1 where the machining is milling and the tool is a milling tool.

18. The process of claim 1 when the machining is cutting and the tool is a cutting tool.

19. The process of claim 18 further comprising milling by the use of a milling tool.

20. The process of claim 1, wherein the guiding of the press foil is in a longitudinal direction through tension control.

21. The process of claim 20, further comprising adjusting the latitudinal position of the press foil.

* * * * *